(12) United States Patent
Thermond et al.

(10) Patent No.: US 7,675,883 B2
(45) Date of Patent: *Mar. 9, 2010

(54) WIRELESS LOCAL AREA NETWORK CHANNEL RESOURCE MANAGEMENT

(75) Inventors: Jeffrey L. Thermond, Saratoga, CA (US); Richard G. Martin, Morgan Hill, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/253,040

(22) Filed: Oct. 16, 2008

(65) Prior Publication Data

US 2009/0040980 A1 Feb. 12, 2009

Related U.S. Application Data

(63) Continuation of application No. 10/271,966, filed on Oct. 15, 2002, now Pat. No. 7,453,839.

(60) Provisional application No. 60/342,684, filed on Dec. 21, 2001.

(51) Int. Cl.
  H04W 4/00 (2009.01)
  H04L 12/50 (2006.01)
  H04L 12/28 (2006.01)
(52) U.S. Cl. .................. 370/328; 370/357; 370/351
(58) Field of Classification Search .......... 455/453, 455/450, 452.1, 556.1, 328, 338, 357, 351; 370/338, 342
  See application file for complete search history.

(56) References Cited

U.S. PATENT DOCUMENTS

| | | | | |
|---|---|---|---|---|
| 5,960,350 A * | 9/1999 | Schorman et al. | ........... | 455/450 |
| 6,129,604 A * | 10/2000 | Maveddat et al. | ........... | 455/453 |
| 6,253,326 B1 * | 6/2001 | Lincke et al. | .................. | 726/12 |
| 6,473,413 B1 * | 10/2002 | Chiou et al. | ................ | 370/331 |
| 6,659,947 B1 * | 12/2003 | Carter et al. | ................ | 600/300 |
| 6,842,621 B2 * | 1/2005 | Labun et al. | ............. | 455/456.3 |
| 6,907,243 B1 * | 6/2005 | Patel | ........................... | 455/442 |
| 7,103,024 B2 * | 9/2006 | Wilson | ....................... | 370/332 |
| 7,164,663 B2 * | 1/2007 | Frank et al. | ................ | 370/328 |
| 7,333,462 B2 * | 2/2008 | Palm et al. | ................... | 370/338 |
| 7,385,926 B2 * | 6/2008 | Kitchin | ....................... | 370/236 |
| 7,394,796 B2 * | 7/2008 | Thermond et al. | .......... | 370/338 |
| 7,545,767 B2 * | 6/2009 | Zhao et al. | .................. | 370/328 |
| 2002/0069334 A1 * | 6/2002 | Hsia et al. | ................... | 711/147 |
| 2002/0075844 A1 * | 6/2002 | Hagen | ......................... | 370/351 |
| 2003/0117986 A1 * | 6/2003 | Thermond et al. | .......... | 370/338 |
| 2004/0017793 A1 * | 1/2004 | Thermond et al. | .......... | 370/338 |
| 2005/0030898 A1 * | 2/2005 | Furlong et al. | ............. | 370/236 |
| 2005/0047380 A1 * | 3/2005 | Palm et al. | .................. | 370/338 |

* cited by examiner

*Primary Examiner*—Tilahun Gesesse
(74) *Attorney, Agent, or Firm*—Garlick Harrison & Markison; Holly L. Rudnick

(57) ABSTRACT

A wired Local Area Network (wired LAN) and a plurality of Wireless Access Points (WAPs) coupled to a wired network infrastructure of the wired LAN service wireless packetized communications for a plurality of Wireless Local Area Network (WLAN) clients. A multi-layer switch of the wired LAN identifies a WLAN client serviced by a WAP from the packetized communications, and upon receiving an overloading indication from the WAP, determines that the WLAN client serviced by the WAP exceeds a usage threshold. Based upon the determination, the multi-layer switch reduces the wireless bandwidth provided to the wireless terminal by the WAP.

20 Claims, 10 Drawing Sheets

WIRELESS LOCAL AREA NETWORK CHANNEL RESOURCE MANAGEMENT

CROSS REFERENCE TO RELATED APPLICATIONS

The present U.S. Utility patent application claims priority pursuant to 35 U.S.C. § 120, as a continuation, to the following U.S. Utility patent application which is hereby incorporated herein by reference in its entirety and made part of the present U.S. Utility patent application for all purposes:

1. U.S. Pat. No. 7,453,839, entitled "Wireless Local Area Network Channel Resource Management,", filed Oct. 15, 2002, which claims priority pursuant to 35 U.S.C. § 119(e) to the following U.S. Provisional Patent Application which is hereby incorporated herein by reference in its entirety and made part of the present U.S. Utility Patent Application for all purposes:

a. U.S. Provisional Application Ser. No. 60/342,684, entitled "Wireless Local Area Network Channel Resource Management,", filed Dec. 21, 2001, expired.

1. FIELD OF THE INVENTION

This invention relates generally to the merging of wired and wireless local area networks; and more particularly to the management of wireless local area network components within a merged network.

2. BACKGROUND OF THE INVENTION

Communication technologies that link electronic devices in a networked fashion are well known. Examples of communication networks include wired packet data networks, wireless packet data networks, wired telephone networks, wireless telephone networks, and satellite communication networks, among other networks. These communication networks typically include a network infrastructure that services a plurality of client devices. The Public Switched Telephone Network (PSTN) is probably the best-known communication network that has been in existence for many years. The Internet is another well-known example of a communication network that has also been in existence for a number of years. These communication networks enable client devices to communicate with one another other on a global basis. Wired Local Area Networks (wired LANs), e.g., Ethernets, are also quite common and support communications between networked computers and other devices within a serviced area. Wired LANs also often link serviced devices to Wide Area Networks and the Internet. Each of these networks is generally considered a "wired" network, even though some of these networks, e.g., the PSTN, may include some transmission paths that are serviced by wireless links.

Wireless networks have been in existence for a relatively shorter period. Cellular telephone networks, wireless LANs (WLANs), and satellite communication networks, among others, are examples of wireless networks. Relatively common forms of WLANs are IEEE 802.11(a) networks, IEEE 802.11(b) networks, and IEEE 802.11(g) networks, referred to jointly as "IEEE 802.11 networks." In a typical IEEE 802.11 network, a wired backbone couples to a plurality of Wireless Access Points (WAPs), each of which supports wireless communications with computers and other wireless terminals that include compatible wireless interfaces within a serviced area. The wired backbone couples the WAPs of the IEEE 802.11 network to other networks, both wired and wireless, and allows serviced wireless terminals to communicate with devices external to the IEEE 802.11 network.

WLANs provide significant advantages when servicing portable devices such as portable computers, portable data terminals, and other devices that are not typically stationary and able to access a wired LAN connection. However, WLANs provide relatively low data rate service as compared to wired LANs, e.g., IEEE 802.3 networks. Currently deployed wired LANs provide up to one Gigabit/second bandwidth and relatively soon, wired LANs will provide up to 10 Gigabit/second bandwidths. However, because of their advantages in servicing portable devices, WLANs are often deployed so that they support wireless communications in a service area that overlays with the service area of a wired LAN. In such installations, devices that are primarily stationary, e.g., desktop computers, couple to the wired LAN while devices that are primarily mobile, e.g., laptop computers, couple to the WLAN. The laptop computer, however, may also have a wired LAN connection that it uses when docked to obtain relatively higher bandwidth service.

Other devices may also use the WLAN to service their communication needs. One such device is a WLAN phone, e.g., an IEEE 802.11 phone that uses the WLAN to service its voice communications. The WLAN communicatively couples the IEEE 802.11 phone to other phones across the PSTN, other phones across the Internet, other IEEE 802.11 phones, and/or to other phones via various communication paths. IEEE 802.11 phones provide excellent voice quality and may be used in all areas serviced by the WLAN.

Significant problems exist, however, when using a WLAN to support voice communications. Because the WLAN services both voice and data communications, the WLAN may not have sufficient capacity to satisfy the low-latency requirements of the voice communication. These capacity limitations are oftentimes exacerbated by channel limitations imposed in many IEEE 802.11 installations. Further, roaming within a WLAN (between WAPs) can introduce significant gaps in service, such gaps in service violating the low-latency requirements of the voice communication.

Each WAP of the WLAN has a limited supported wireless bandwidth that must service each wireless terminal within a respective service area. When a single wireless terminal accesses the WAP, it may consume a relatively large portion of the WAP's wireless bandwidth. Such heavy usage by a single wireless terminal reduces the wireless bandwidth that may be used by other wireless terminals operating within the respective service area, thus degrading their service.

Thus, there is a need in the art for improvements in the operation and management of WLANs, particularly when the WLANs are installed additionally to wired LANs.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE DRAWINGS

Figure 1:
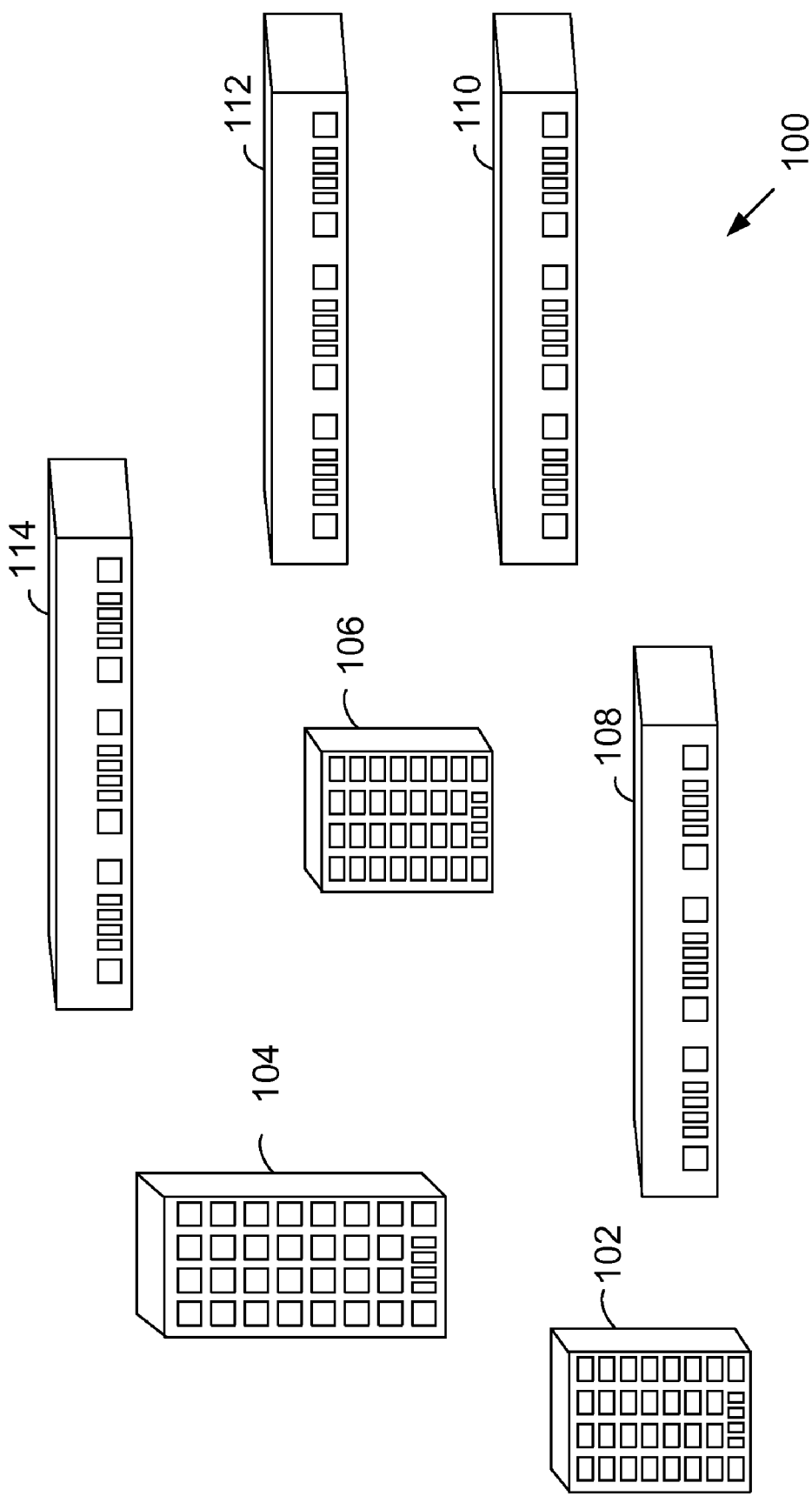
FIG. 1 is a system diagram illustrating a premises in which a network constructed according to the present invention is deployed.

FIG. 1 is a system diagram illustrating a premises 100 in which a network constructed according to the present invention is deployed. The premises 100 (campus) includes office buildings 102, 104, 106 and industrial buildings 108, 110, 112, and 114. The premises 100 may correspond to a company such as a technology company, a seller of goods, a service company, or another type of company. Contained within each of the office buildings 102, 104, and 106 are a number of offices, each of which provides a working space for at least one person. Each of the industrial buildings 108, 110, 112, and 114 provides space for manufacturing, storage, or another purpose. People also work within industrial buildings 108, 110, 112, and 114.

Contained within each of these buildings 102-114 are computer workstations, computer servers, printers, FAX machines, phones, and other electronic devices. Each of these electronic devices has its communication requirements. For example, computer workstations, computer servers, and printers each require data communication service. Such data communication service requires that the devices can communicate with other devices located within the premises 100 and with devices located external to the premises 100 across one or more data networks. The FAX machines and phones require coupling to one another and to the Public Switched Telephone Network (PSTN).

According to the present invention, both wired and wireless communications are supported within the premises 100 via a network that provides both wired Local Area Network (wired LAN) and Wireless Local Area Network (WLAN) functionality. The manner in which the network is constructed and the manner in which the wired LAN and WLAN functionality are provided are described further with reference to FIGS. 2 through 10.

Figure 2:
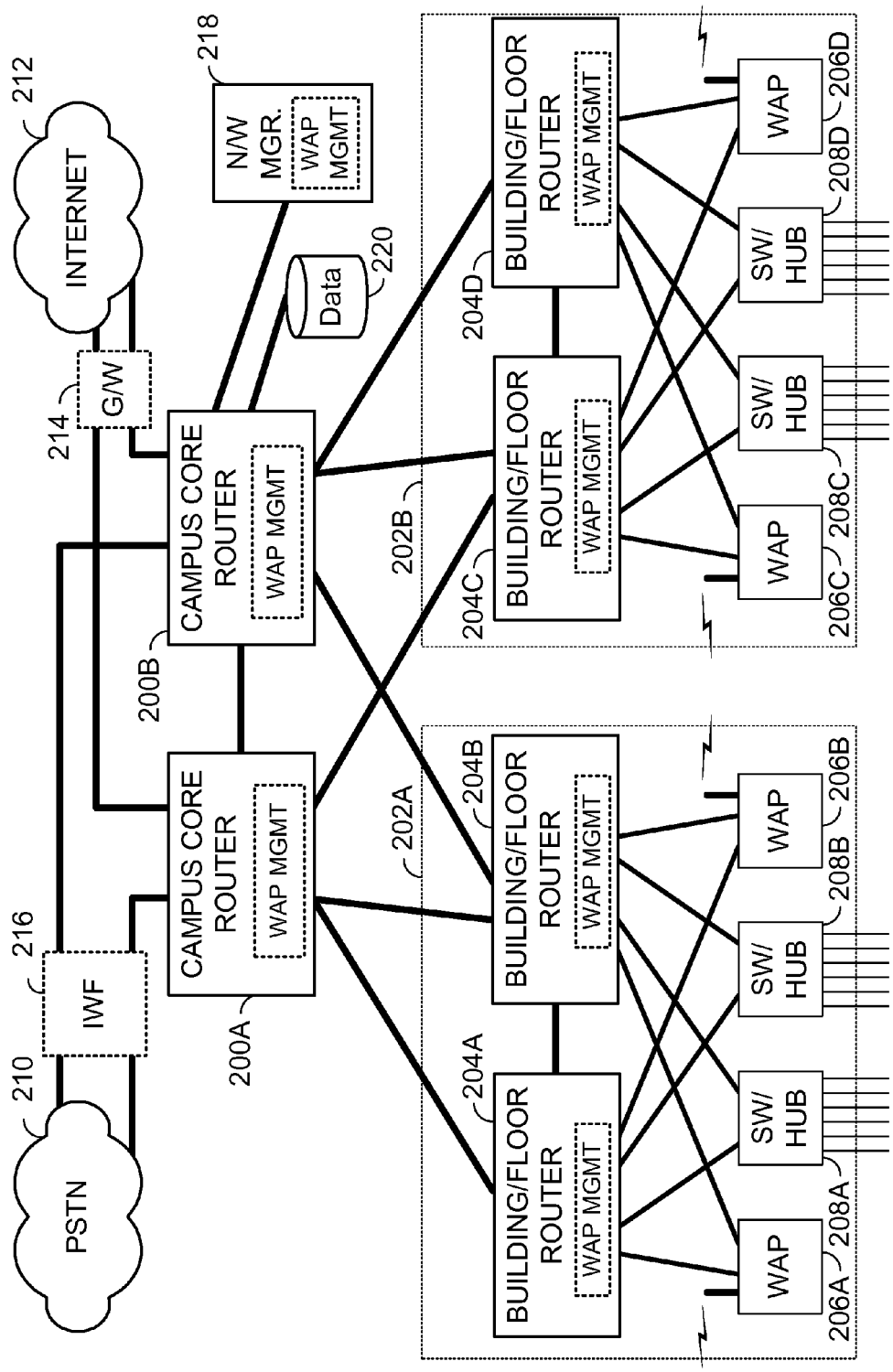
FIG. 2 is a system diagram illustrating a premises based network constructed according to the present invention that supports both wired local area network and wireless local area network operations.

FIG. 2 is a system diagram illustrating a premises based network constructed according to the present invention that supports both wired LAN and WLAN operations. Illustrated in FIG. 2 are some of the components of the network infrastructure that support the premises 100 of FIG. 1. The network includes a pair of campus core routers 200A and 200B that redundantly service the premises 100. Both of the campus core routers 200A and 200B couple to the PSTN 210, via an Inter Working Function "IWF" in some embodiments. Both of the campus core routers 200A and 200B also couple to the Internet 212, via a Gateway or Firewall 214 in some embodiments. As is generally known, the PSTN 210 services conventional voice communications but may also service packet data communications, e.g., Digital Subscriber Lines, etc. The Internet 212 services most packet data communications for the premises 100 and may service Internet Protocol (IP) telephony as well. As should be appreciated by the reader, the campus core routers 200A and 200B may couple to other networks across the Internet 212 or via dedicated network connections.

Each building serviced by the network includes its own building network infrastructure. Each building network infrastructure includes components contained within dotted lines 202A and 202B, for example. Each of the office buildings 102, 104, and 106 shown in FIG. 1 includes a building network infrastructure. The building network infrastructure 202A includes building/floor routers 204A and 204B that service a plurality of wired network switches/hubs 208A and 208B and a plurality of Wireless Access Points (WAPs) 206A and 206B. The communication links between the building/floor routers 204A and 204B and the campus core routers 200A and 200B are typically at a relatively high data rate, e.g., 1000 Mbps. The communication links between the building/floor routers 204A and 204B and the WAPs 206A and 206B and the switches/hubs 208A and 208B are also typically at the relatively high data. However, client connections to the switches/hubs 208A and 208B are typically at a relatively lower data rate, e.g., 100 Mbps or 10 Mbps. The building network infrastructure 202B services another building and includes building/floor routers 204C and 204C, switches/hubs 208C and 208D, and WAPs 206C and 206D.

The switches/hubs 208A-208D service a plurality of wired LAN clients, e.g., desktop computers, wired phones, and other wired LAN devices. The WAPs 206A-206D service wireless network clients, e.g., laptop computers, wireless terminals, but may also service other devices that cannot easily access a wired LAN plug, such as a desktop computer. The WAPs 206A-260D may operate according to a standardized communication protocol, e.g., IEEE 802.11(a), IEEE 802.11(b), IEEE 802.11(g), etc. In combination, these devices service most, if not all of the packet communications within the premises 100 of FIG. 1. Of course, the structure of FIG. 2 is an example only and an actual implementation would include substantially more equipment and more links.

At least one network manager 218 and at least one database 220 couple to the campus core router 200B and/or the campus core router 200A. As will be further described herein, the network manager 218 operates in cooperation with the campus core routers 200A and 200B and/or the building floor routers 204A-204B to manage access to the WAPs 206A-206D. While the database 220 and the network manager 218 are shown to reside external to the campus core routers 200A, the components could also be located within a common housing and/or be implemented by the processing components of the campus core routers 200A. Further, the database and the network manager 218 may not couple directly to the campus core router 200A but may coupled indirectly thereto.

The campus core routers 200A and 200B and/or the building/floor routers 204A, 204B, 204C and/or 204C support Wireless Access Point (WAP) management according to the present invention. The campus core routers 200A and 200B and/or the building/floor routers 204A, 204B, 204C and/or 204C are referred to as multi-layer switches further herein and the management operations that they perform are described further with reference to FIGS. 3 through 10. These operations are typically implemented in software but may be implemented partially in software and partially in hardware.

Figure 3:
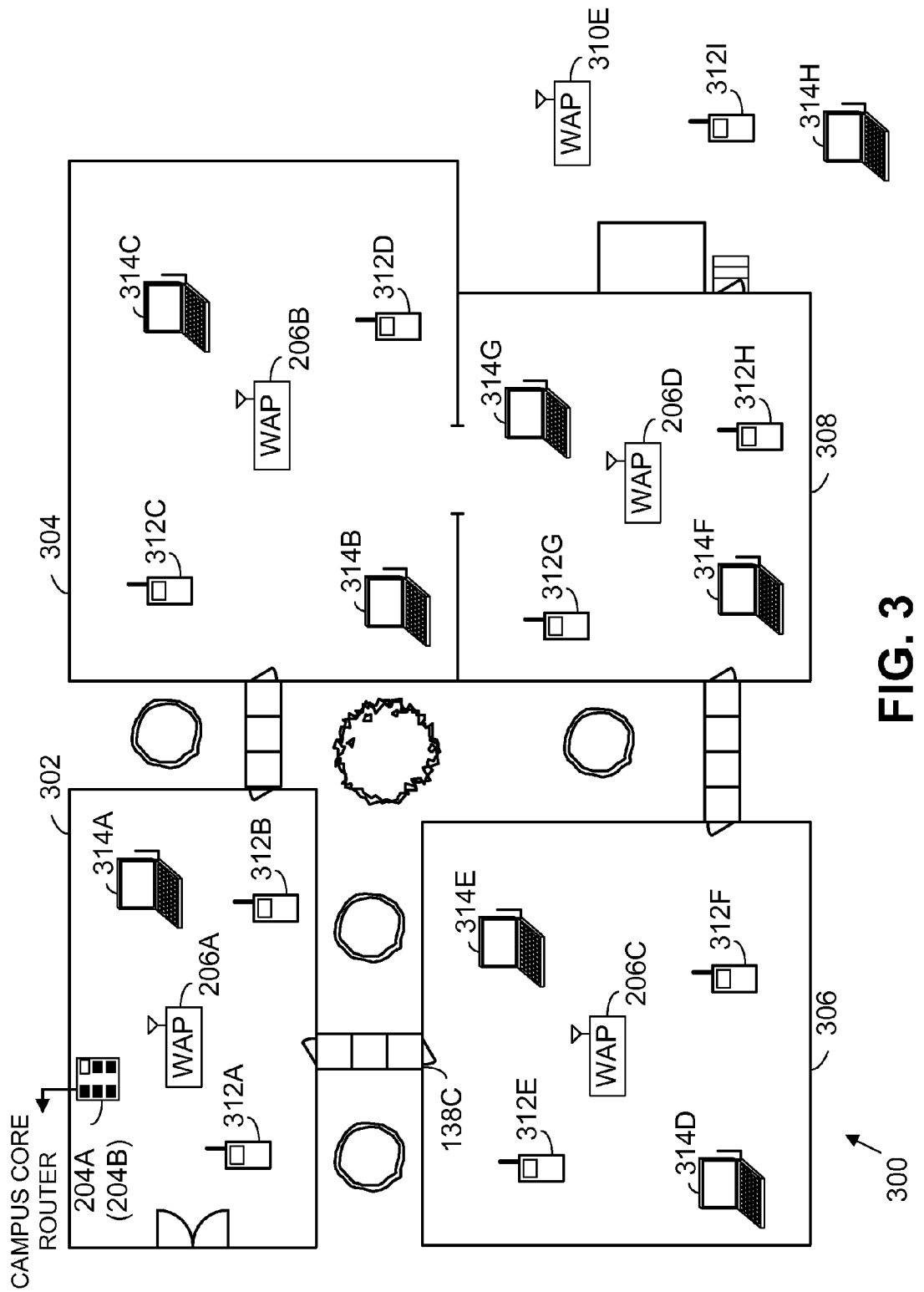
FIG. 3 is a partial system diagram illustrating a portion of a campus in which wireless communications are serviced according to the present invention.

FIG. 3 is a partial system diagram illustrating a portion of a campus in which wireless communications are serviced according to the present invention. A building floor 300 shown in FIG. 3 is part of the campus and may be a lower floor of one of the buildings of FIG. 1, e.g., building 102. The building floor 300 includes a plurality of rooms 302, 304, 306, and 308. Each of these rooms 302, 304, 306, and 308 includes a WAP 206A, 206B, 206C, and 206D, respectively, that services a corresponding area. Further, an external WAP 206E provides service external to room 308 of building floor 300. Each of these WAPs 206A-206E couples to a servicing building/floor router 204A or 204B via the wired LAN backbone. The servicing building/floor router 204A or 204B couples to the campus core router 200A (or 200B) as shown in FIG. 2.

Serviced within the building floor 300 are wireless terminals 312A-312I and laptop computers 314A-314H. Each of these devices wirelessly communicates with a servicing WAP. For example, laptop computer 314A and wireless terminals 312A and 312B wirelessly communicate with WAP 206A (in their illustrated positions). Each of the WAPs 206A-206D supports wireless communications primarily within a designated area, rooms 302-308, respectively. However, the coverage area of each WAP 206A-206D extends beyond the boundaries of its respective rooms 302-308 so that overlapping coverage areas exist. For example, WAPs 206A and 206C provide service between rooms 302 and 306 so that wireless terminals that roam between the rooms continue to receive wireless communication service when between the rooms 302 and 306. Further, WAP 206E supports wireless communications outside of the floor 300 to service laptop computer 314H and wireless terminal 312I. Note that the WAP placement of FIG. 3 is an example only and that each room may contain multiple WAPs or that a single WAP may cover multiple rooms.

Figure 4:
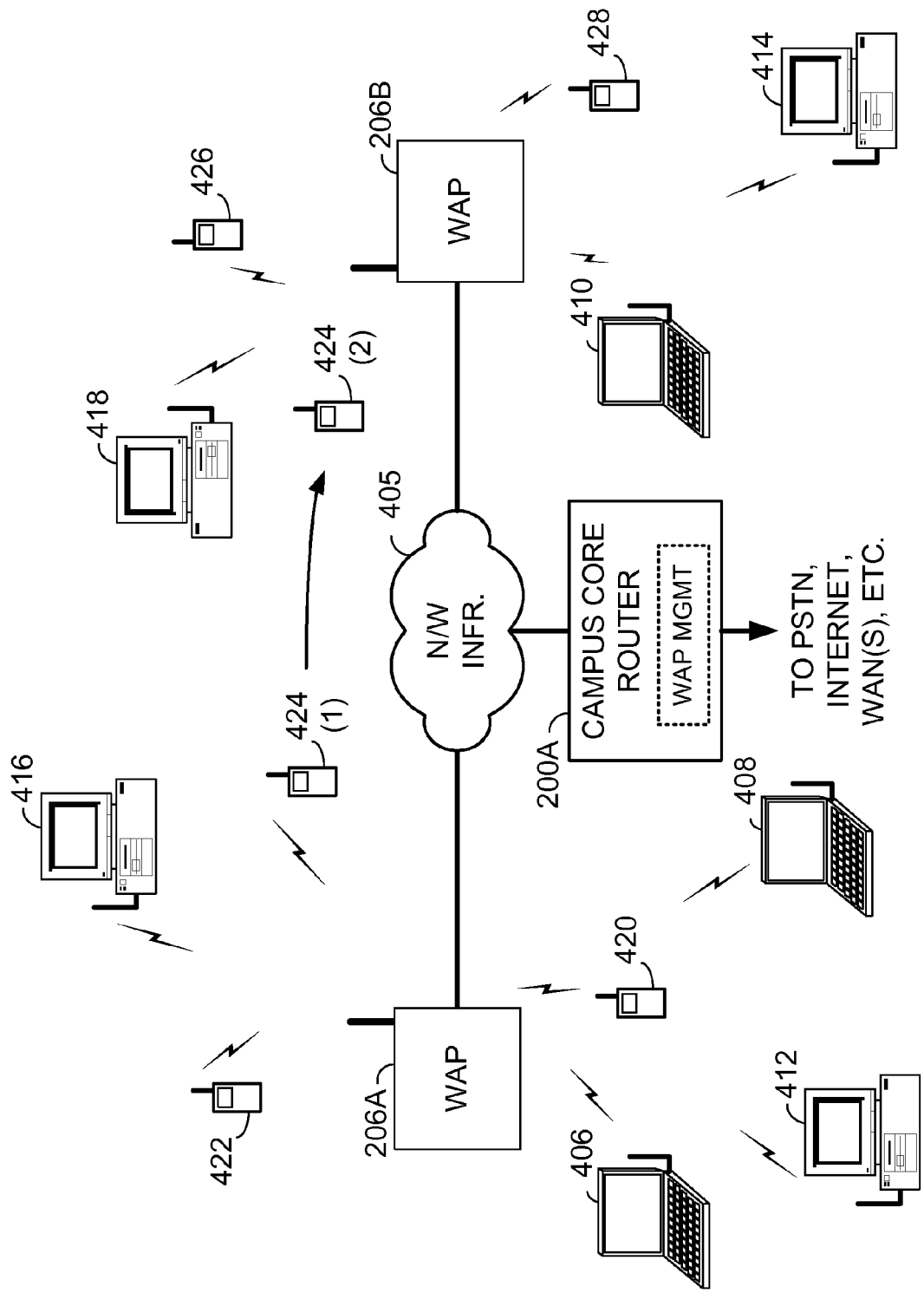
FIG. 4 is a block diagram partially illustrating a portion of a network of FIG. 3 that supports operations according to the present invention.

FIG. 4 is a block diagram partially illustrating a portion of a network of FIG. 3 that supports operations according to the present invention. The portion of the network shown includes WAPs 206A and 206B that support wireless communications within a jointly serviced area, for example, the rooms 302 and 304 of FIG. 3. The WAPs 206A and 206B couple to the network infrastructure 405, e.g., the network infrastructure shown in FIG. 2. The WAPs 206A and 206B service wireless communications for laptop computers 406, 408, and 410, desktop computers 412, 414, 416, and 418, and wireless terminals 420, 422, 422, 424, 426, and 428. The service coverage areas provided by WAPs 206A and 206B partially overlap. The network infrastructure 405 couples to one or more servicing multi-layer switches, e.g., campus core router 200A that includes WAP management functionality according to the present invention.

According to one aspect of the present invention, the operation of the plurality of WAPs 206A and 206B are partially managed by a core router, e.g., campus core router 200A, to ensure that that no single serviced wireless terminal consumes all or a significant portion of the bandwidth of the WAP. Today, 802.11 networks service at most data rates of 11 Mbps. This data rate translates into a more typical data rate of 5.5 Mbps or less at protocol layer 4. Further, Bit Error Rates (BERs) of 802.11 networks are generally 100 times worse than BERs of wired LANs. Thus, wireless capacity supported by each WAP is quite scarce. According to the present invention, WAPs and multi-layer switches that support the WAPs perform flow control on all wireless terminals to ensure that no single user consumes a disproportionate amount of the available bandwidth of the WAP.

In performing WAP resource management, a managing device, e.g., multi-layer switch 200A and/or network manger 218 automatically detects a wireless terminal that is exceeding a permissible bandwidth usage of a WAP. The managing device then intervenes to limit the wireless bandwidth used by the wireless terminal. One technique used by the managing device for limiting bandwidth usage is to slow the operation of input and output buffer queues to thereby limit the rate at which TCP acknowledgements occur. With this reduction in TCP acknowledgement rate, the data rate at the TCP layer is reduced and therefore the offending device uses less wireless bandwidth. Another technique used by the managing device is to reduce a Class of Service (CoS) provided to the wireless terminal by the WAP. These operations are described in detail with particular reference to FIGS. 8-10.

Figure 5:
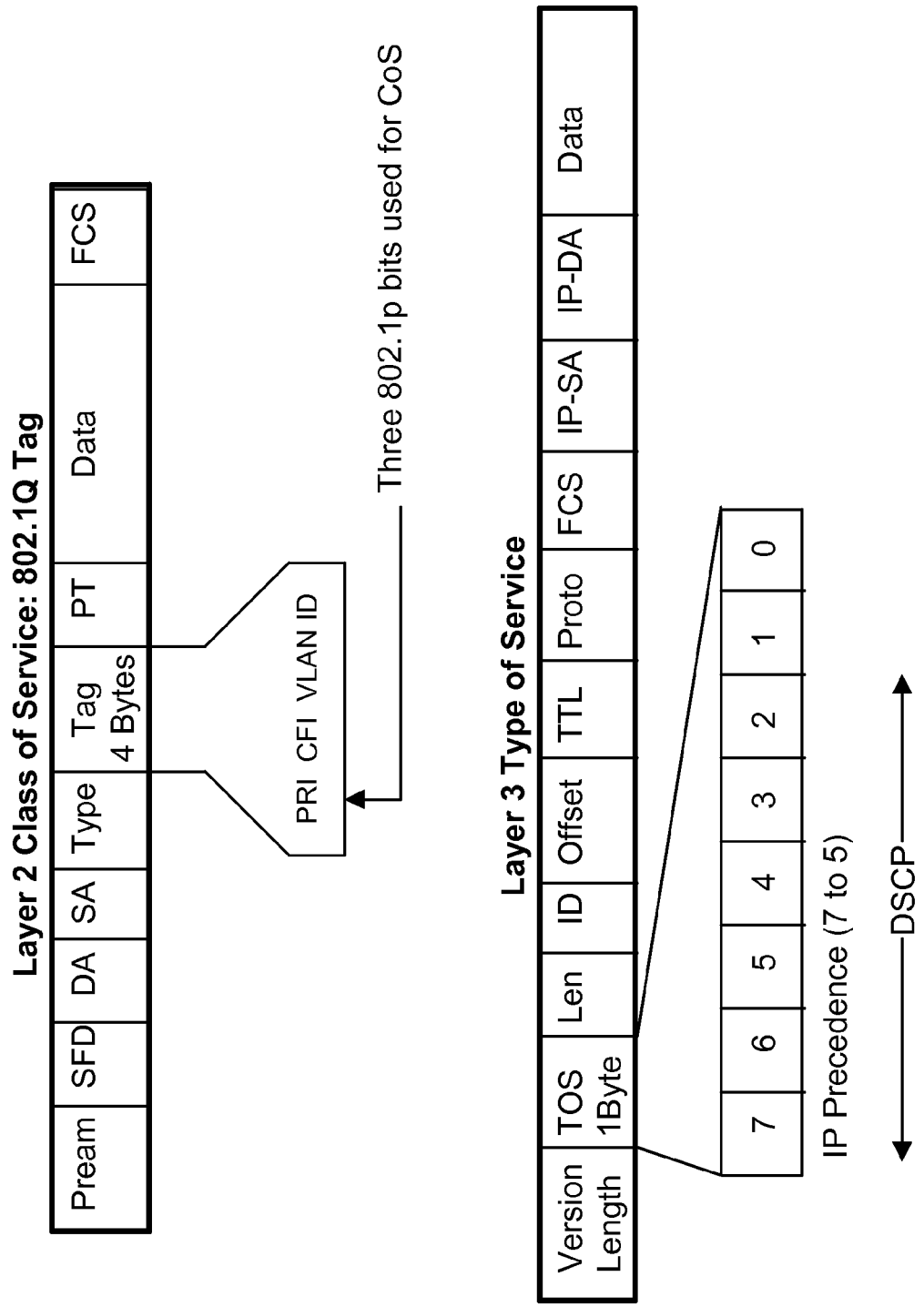
FIG. 5 is a block diagram illustrating two manners in which Class of Service information may be incorporated into data packets according to the present invention.

FIG. 5 is a block diagram illustrating two manners in which Class of Service information may be incorporated into data packets according to the present invention. In one operation of the present invention, a multi-layer switch, e.g., campus core router 200A, alters the CoS of packetized communications to alter the manner in which a servicing WAP processes the packetized communication. If a wireless terminal/WLAN client is consuming a disproportionate amount of the resources of the WAP, the campus core router 200A may reduce the CoS of packets for the wireless terminal/WLAN client that it forwards to the WAP. In such case, the WAP would then provide a lesser grade of service to the wireless terminal/WLAN client, thus reducing the WAP resources being consumed by the wireless terminal/WLAN client.

Figure 6:
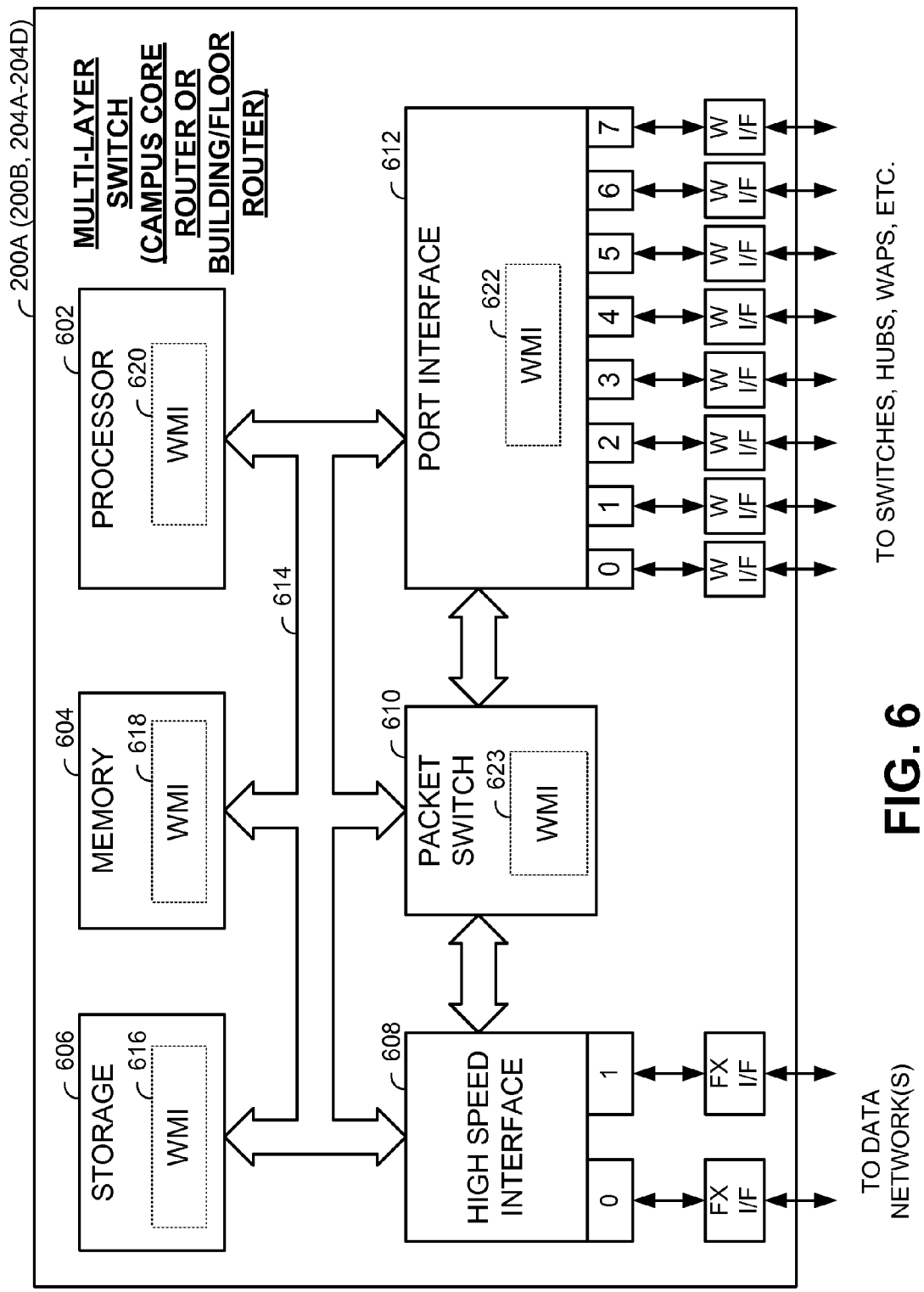
FIG. 6 is a block diagram illustrating a multi-layer switch constructed according to the present invention.

FIG. 6 is a block diagram illustrating a multi-layer switch, e.g., campus core router 200A (or 200B) or building/floor router 204A-204D constructed according to the present invention. The structure illustrated in FIG. 6 is a diagrammatic representation of the structure of the multi-layer switch of FIG. 2 with minimal detail. As the reader will appreciate, other structures will support operation according to the present invention and the structure of FIG. 6 is only one example of the structure of a multi-layer switch. The multi-layer switch 200A includes a processor 602, memory 604, storage 606, a high-speed interface 608, and a port interface 612, all of which couple via a system bus 614. Also contained within the multi-layer switch 200A is a packet switch 610 that couples to high-speed interface 608, port interface 612, and the system bus 614. The high-speed interface 608 either couples to a plurality of data networks or couples redundantly to a single data network. These interconnections are designated to be fiber interconnections. However, the interconnections could also be wired connections. With the structure of FIG. 2, for example, the high-speed interface 608 couples the multi-layer switch 200A to the gateway 214 and to the IWF 216. The port interface 612 includes eight ports and couples the multi-layer switch 200A to the wired network infrastructure of the LAN. Other embodiments of the port interface 612 of the multi-layer switch 200A may include a greater number, or a lesser number of ports.

In order to operate according to the present invention, the multi-layer switch 200A performs software and/or hardware operations. The instructions and operations that cause the multi-layer switch 200A to operate according to the present invention are referred to as WAP Management Instructions (WMI). When the WMI are implemented as software instructions, WMI are initially stored as WMI 616 in storage 606. The storage 606 may be an optical media, a hard drive, or other substantially static storage device. Memory 604 may include dynamic random access memory, read-only memory, or another type of memory that is known in the arts to facilitate the storage of instructions and data and that may be accessed by processor 602. Processor 602 may be a single microprocessor, multiple microprocessors, a processing module, or another processing device that is capable of executing software instructions and controlling the operation of other multi-layer switch 200A components coupled via system bus 614.

In executing the WMI 616, the WMI 616 are copied from storage 606 to memory 604 as WMI 618 and then read by the processor 602 from memory 604 as WMI 620. The execution of the WMI 620 by the processor 602 causes the processor to program/control the operation of the port interface 612 to operate according to the present invention. The processor 602 may then configure WMI 622 in the port interface 612 and/or WMI 623 in the packet switch 610. Such configuration may include programming routing tables with values and parameters. In combination, the WMI operations 620 performed by the processor, the WMI 622 performed by the port interface 612, and the WMI 623 performed by the packet switch enable the multi-layer switch 200A to operate according of the present invention.

Figure 7:
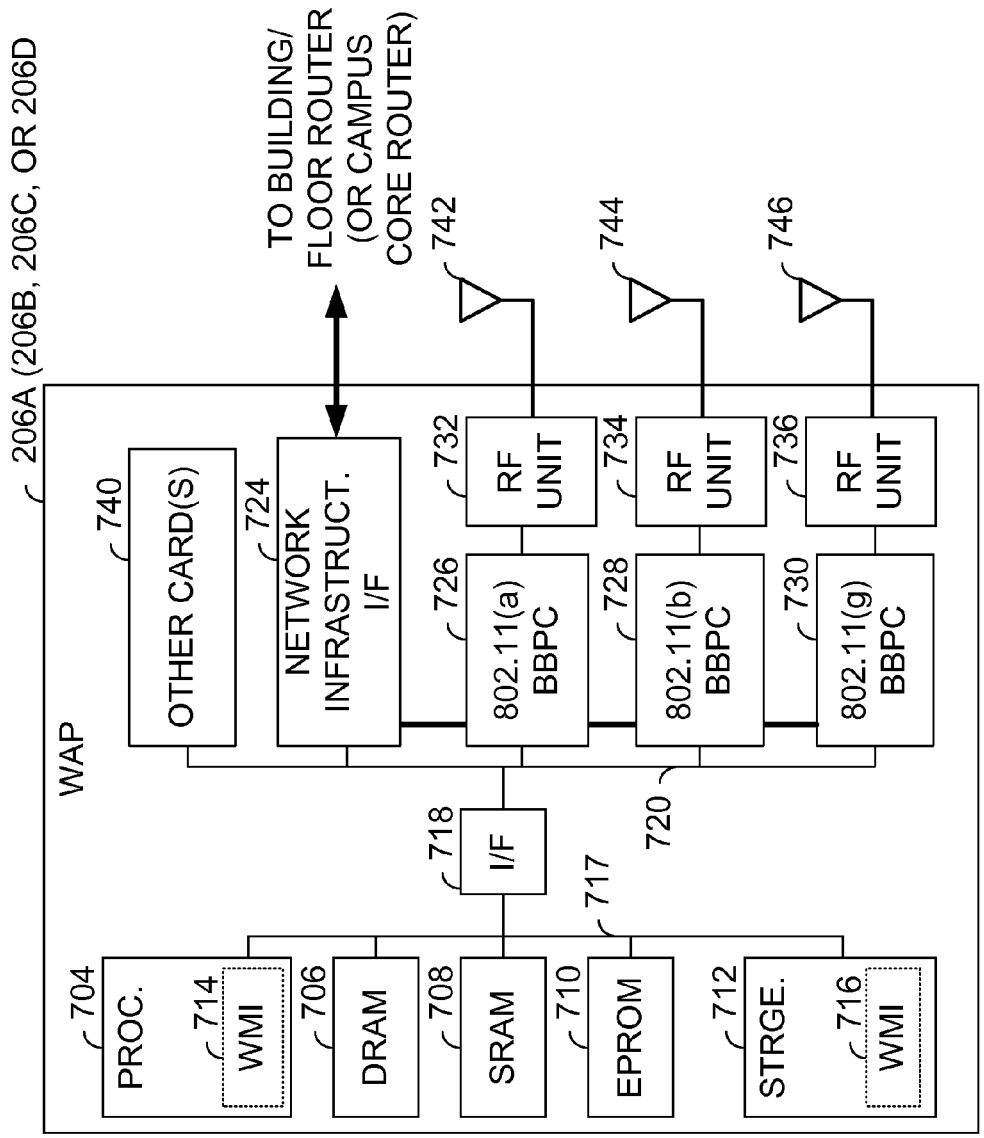
FIG. 7 is a block diagram illustrating a Wireless Access Point constructed according to the present invention.

FIG. 7 is a block diagram illustrating a Wireless Access Point (WAP) 106A, 106B, 106C, or 106D constructed according to the present invention. The WAP 106A includes a processor 704, dynamic RAM 706, static RAM 708, EPROM 710, and at least one data storage device 712, such as a hard drive, optical drive, tape drive, etc. These components (which may be contained on a peripheral processing card or module) intercouple via a local bus 717 and couple to a peripheral bus 720 via an interface 718.

Various peripheral cards couple to the peripheral bus 720. These peripheral cards include a network infrastructure interface card 724, which couples the WAP 103 to its servicing building/floor router (or core router). Baseband processing cards 726, 728 and 730 couple to Radio Frequency (RF) units 732, 734, and 736, respectively. Each of these baseband processing cards 726, 728, and 730 performs digital processing for a respective wireless communication protocol, e.g., 802.11(a), 802.11(b), and 802.11(g), serviced by the WAP 206A. The RF units 732, 734, and 736 couple to antennas 742, 744, and 746, respectively, and support wireless communication between the WAP 103 and wireless subscriber units. The WAP 103 may include other card(s) 740 as well. While the WAP 206A illustrated in FIG. 7 is shown to support three separate wireless communication protocols, other embodiments of the WAP 206A could support one, two, or more than three communication protocols.

The WAP 206A performs operations according to the present invention that are embodied at least partially as software instructions, i.e., WMI. WMI 714 enable the WAP 206A to perform the operations of the present invention. The WMI 716 are loaded into the storage unit 712 and some or all of the WMI 714 are loaded into the processor 704 for execution. During this process, some of the WMI 716 may be loaded into the DRAM 706.

Figure 8:
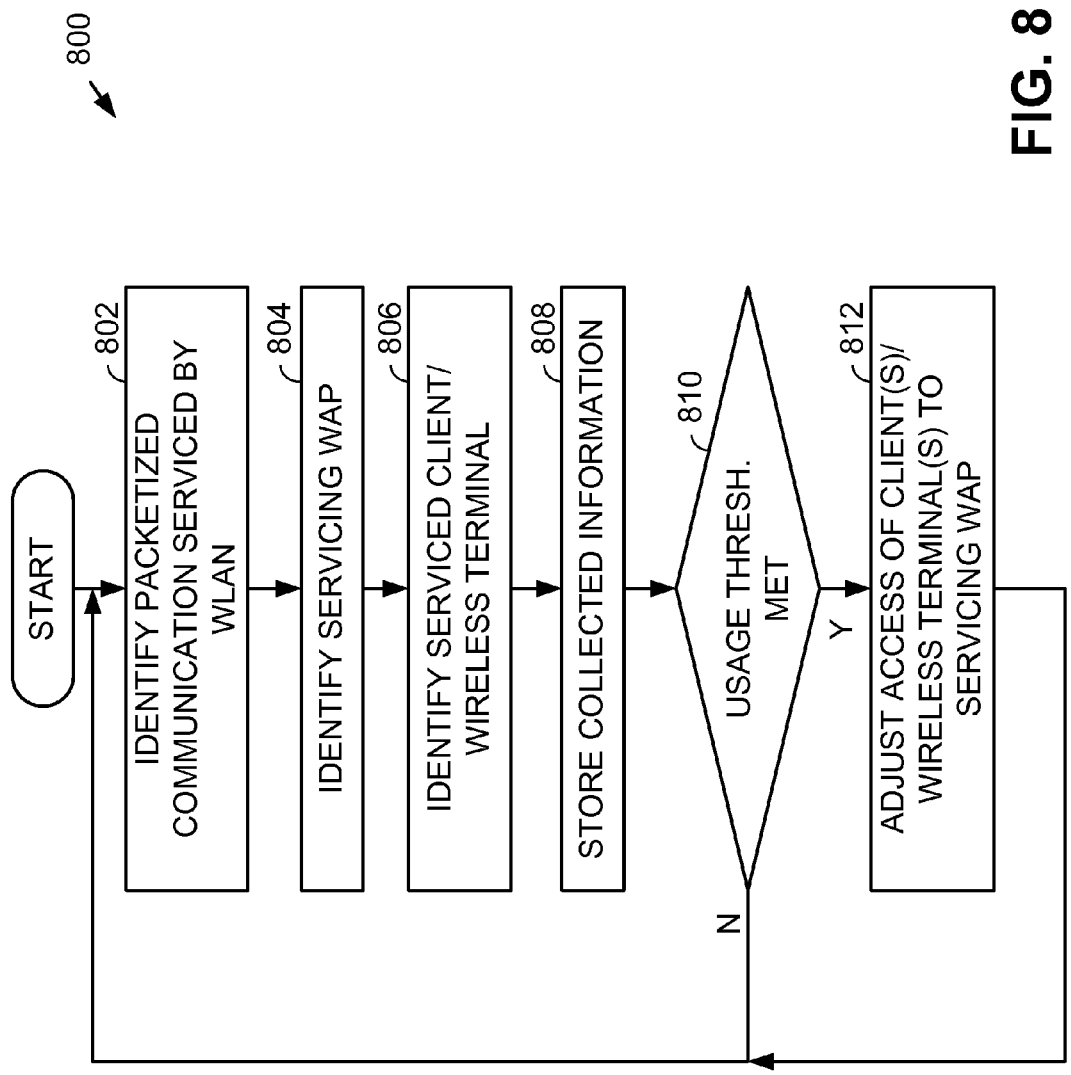
FIG. 8 is a logic diagram illustrating operation of the multi-layer switch of FIG. 6 according to the present invention.

FIG. 8 is a logic diagram illustrating operation of the multi-layer switch of FIG. 6 according to the present invention. Operation commences wherein the multi-layer switch identifies a packetized communication serviced by the WLAN (step 802). Because the multi-layer switch services both wired LAN and WLAN operations, the multi-layer switch identifies the packetized communication as being serviced by the WLAN via either a source/destination of the packetized communication as corresponding to a WLAN client, a WLAN tag contained in the packetized communication, or by other means. Then, the multi-layer switch identifies a servicing WAP (step 804). The servicing WAP is one of a plurality of WAPs serviced by the combined wired LAN and WLAN. Next, the multi-layer switch identifies the serviced WLAN client/wireless terminal (step 806). Each of these identification operations is performed by extracting information from the packetized communication and, in some operations, by comparing extracted information to information stored on the multi-layer switch. The multi-layer switch then stores the information that has been obtained via investigation of the packetized communication. This information may be stored locally at the multi-layer switch or may be stored at the network manager 218 or the database 220.

Periodically, after each packetized communication investigation, or upon the triggering of an overloading threshold, the multi-layer switch or network manager determines whether a loading threshold is met for one or more of the managed WAPs (step 810). These operations are described in more detail with reference to FIG. 9. If a loading threshold is not met, operation returns to step 802. However, if a loading threshold is met, the multi-layer switch or the network manager adjusts the access of one or more WLAN clients/wireless terminals to their servicing WAPs. One technique for adjusting access is to alter the CoS provided to the wireless terminal. Another technique, which is described with reference to FIG. 10, is to alter the rate at which higher layer protocols, e.g., TCP layer, apply data.

RMON Ethernet standardized operations may be employed to perform the operations of FIG. 8. RMON is a Management Information Base (MIB) Ethernet standard that defines current and historical MAC-layer statistics and control objects, allowing real-time information capture across an entire Ethernet based network. The RMON standard is an SNMP MIB definition described in RFC 1757 (formerly 1271) for Ethernet. The RMON MIB provides a standard method to monitor the basic operations of the Ethernet, providing inoperability between SNMP management stations and monitoring agents. RMON also provides a powerful alarm and event mechanism for setting thresholds and for notifying you of changes in network behavior.

RMON is used to analyze and monitor network traffic data within remote LAN segments from a central location. RMON is used according to the present invention to detect unfair usage of WAP resources. In some embodiments, RMON automatic histories are set up on one or more multi-layer switches to collect traffic data over a period and to report the traffic data to the network manager. The network manager then periodically retrieves histories and adjusts the access of clients/wireless terminals to WAP resources as described in FIG. 8.

Figure 9:
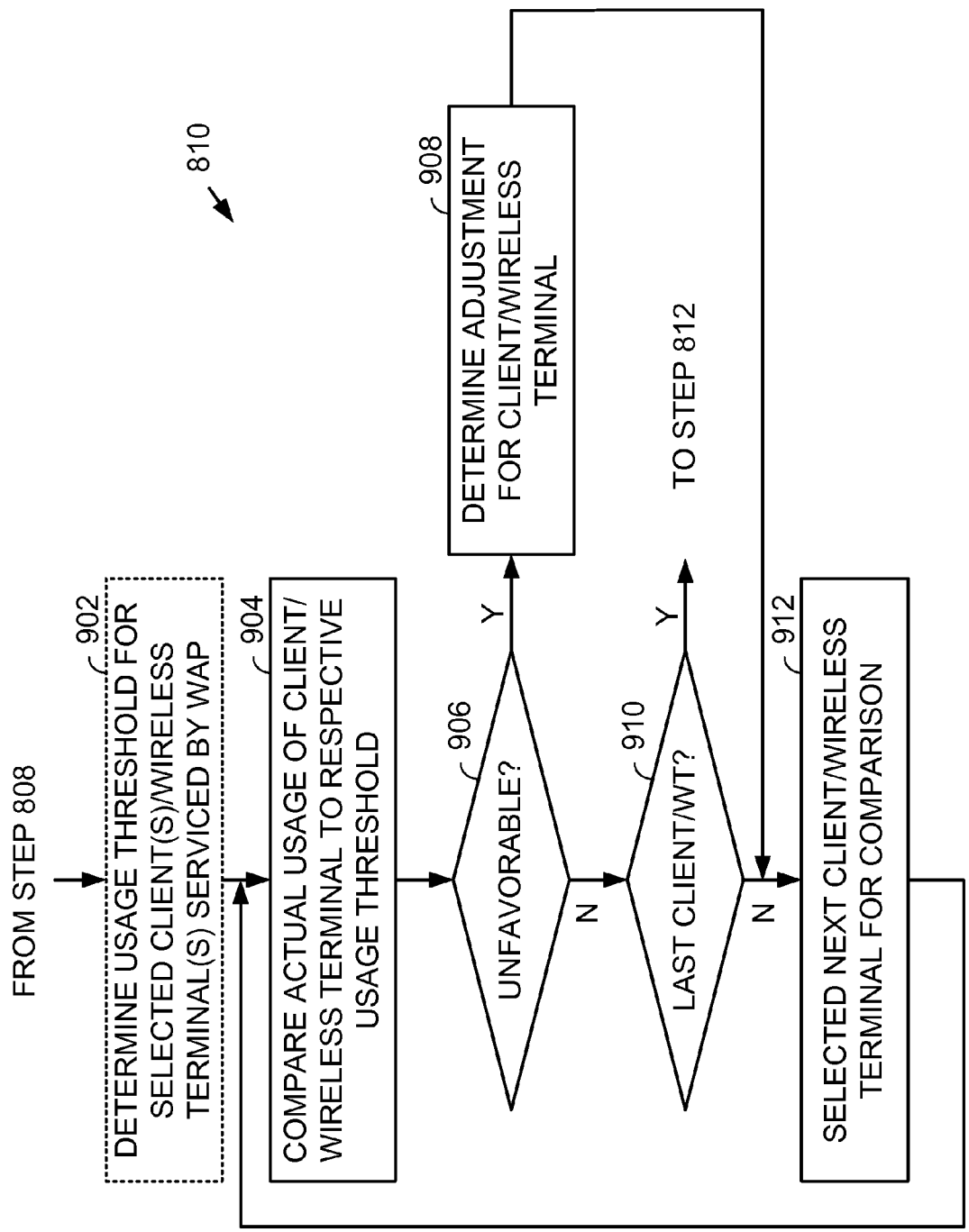
FIG. 9 is a logic diagram illustrating one embodiment of operation of FIG. 8 in which the multi-layer switch of FIG. 6 determines whether to and the manner in which wireless terminal access to a WAP is adjusted.
Figure 10:
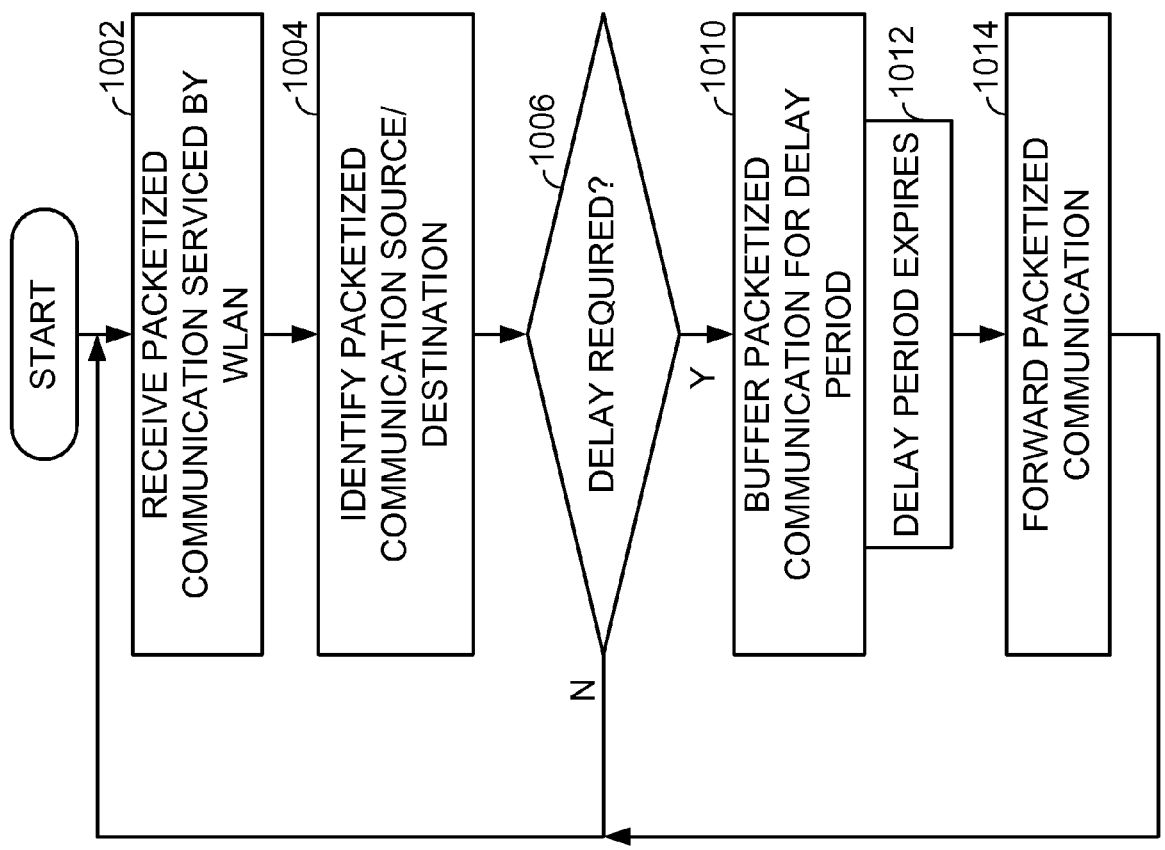
FIG. 10 is a logic diagram illustrating one technique for adjusting the access of a wireless terminal to a servicing WAP by increasing respective packetized communication delay.

FIG. 9 is a logic diagram illustrating one embodiment of operation of FIG. 8 in which the multi-layer switch of FIG. 6 determines whether to and the manner in which wireless terminal access to a WAP is adjusted. The operations of FIG. 9 may be performed after information relating to a packetized communication serviced by the WAP is collected, periodically for each WAP, or upon the triggering of a loading event, e.g., overloading indication from a WAP. Usage thresholds may be determined periodically or based upon the real-time usage of a WAP (step 902). Usage thresholds for each WAP consider the level of usage that each wireless terminal is allowed, e.g., a percentage of available resources, a data rate per unit time, or another measure of the wireless terminal's usage of the wireless resources of a WAP.

Next, the actual usage of a WLAN client/wireless terminal is compared to a respective usage threshold (step 904). If this comparison is unfavorable (as determined at step 906), an adjustment for the WLAN client/wireless terminal is then determined (step 908). If the comparison for the WLAN client/wireless terminal is not unfavorable, it is determined whether the current WLAN client/wireless terminal is the last for consideration (step 910). If so, operation proceeds to step 812 of FIG. 8. If not, a next WLAN client/wireless terminal is selected for comparison (step 912) and operation returns to step 904.

FIG. 10 is a logic diagram illustrating one technique for adjusting the access of a wireless terminal to a servicing WAP by increasing respective packetized communication delay. The packetized communications in which delay is to be added and the amount of delay to be added into such packetized communications were determined at step 908 of FIG. 9 based upon estimates of how added delay will affect loading on servicing WAPs.

With the operations of FIG. 10, a multi-layer switch receives a packetized communication that is serviced by the WLAN (step 1002). The multi-layer switch identifies the packetized communication source/destination (step 1004). The source/destination may be a WLAN client/wireless terminal serviced by a WAP of the WLAN. If so, and if delay is required (as determined at step 1006), the packetized communication is buffered by the multi-layer switch for a delay period (step 1010). After the delay period has expired (at step 1012), the multi-layer switch forwards the packetized communication (step 1014). From step 1014, operation returns to step 1002.

The packetized communication may be either received from or directed to the serviced WLAN client/wireless terminal. In either case, by delaying the packetized communications, TCP layers operation on the WLAN client/wireless terminal or on its communication partner will observe an increased round trip delay for the communication. With the increased round trip delay, the TCP layers will reduce the rate at which they apply packetized communications to the communication link. With the reduced rate of application, loading on the servicing WAP will decrease for the particular WLAN client/wireless terminal.

The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents and alternatives falling within the spirit and scope of the present invention as defined by the claims.

The invention claimed is:

1. A method for servicing Wireless Local Area Network (WLAN) clients by a wired Local Area Network (wired LAN) and a plurality of Wireless Access Points (WAPs), the method comprising:
   wirelessly servicing, by a WAP of the plurality of WAPs and a multi-layer switch of the wired LAN, packetized communications for a plurality of WLAN clients;
   identifying, by the multi-layer switch, a WLAN client serviced by the WAP from the packetized communications;
   receiving, at the multi-layer switch, an overloading indication from the WAP;
   determining, by the multi-layer switch, whether the WLAN client serviced by the WAP exceeds a usage threshold; and
   if so, reducing the wireless bandwidth provided to the WLAN client by the WAP.

2. The method of claim 1, wherein reducing the wireless bandwidth provided to the WLAN client by reducing a Class of Service (CoS) provided to the WLAN client by the WAP.

3. The method of claim 1, wherein reducing the wireless bandwidth provided to the WLAN client by the WAP includes introducing round trip delay into packetized communications serviced by the multi-layer switch to reduce the rate at which corresponding higher layer communication protocols apply data.

4. The method of claim 3, wherein introducing round trip delay causes a TCP layer corresponding to the WLAN to reduce its rate of data application to corresponding lower layer protocols.

5. The method of claim 1, wherein in determining that the WLAN client serviced by the WAP exceeds a usage threshold, the method includes:
   determining a usage threshold for the WLAN client;
   comparing a current usage level of the WLAN client to the usage threshold for the WLAN client; and
   when the comparison is unfavorable, concluding that the WLAN client serviced by the WAP exceeds the usage threshold.

6. The method of claim 1, wherein identifying, by the multi-layer switch, the WLAN client from the packetized communications includes:
   extracting MAC addresses from the packetized communications, one of the MAC addresses corresponding to the WLAN client.

7. The method of claim 1, wherein the step of identifying, by the multi-layer switch, the WLAN client from the packetized communications is performed substantially in accordance with the RMON Ethernet standard.

8. A multi-layer switch that supports a wired Local Area Network (wired LAN) having a wired network infrastructure, the multi-layer switch comprising:
   a high-speed packet data network interface that couples the multi-layer switch to a high-speed packet data network;
   a port interface communicatively coupled to the high speed packet data network and to the wired network infrastructure, wherein the port interface further communicatively couples the multi-layer switch to a plurality of Wireless Access Points (WAPs) that couple to the wired network infrastructure; and
   a processor operably coupled to the port interface, wherein the processor executes a plurality of software instructions that, upon execution, cause the multi-layer switch to:
   monitor packetized communications serviced by a WAP of the plurality of WAPs;
   identify a Wireless Local Area Network (WLAN) client serviced by the WAP from the monitored packetized communications;
   receive an overloading indication from the WAP;
   determine that the WLAN client serviced by the WAP exceeds a usage threshold; and
   reduce the wireless bandwidth provided to the WLAN client by the WAP.

9. The multi-layer switch of claim 8, wherein the multi-layer switch reduces the wireless bandwidth provided to the WLAN client by reducing a Class of Service (CoS) provided to the WLAN client by the WAP.

10. The multi-layer switch of claim 8, wherein the multi-layer switch reduces the wireless bandwidth provided to the WLAN client by the WAP by introducing round trip delay into packetized communications serviced by the multi-layer switch to reduce the rate at which corresponding higher layer communication protocols apply data.

11. The multi-layer switch of claim 8, wherein the multi-layer switch determines that the WLAN client serviced by the WAP exceeds a usage threshold by:
   determining a usage threshold for the WLAN client;
   comparing a current usage level of the WLAN client to the usage level for the WLAN client; and
   when the comparison is unfavorable, concluding that the WLAN client serviced by the WAP exceeds the usage threshold.

12. The multi-layer switch of claim 8, wherein the multi-layer switch identifies the WLAN client by:
   extracting MAC addresses from the packetized communications, one of the MAC addresses corresponding to the WLAN client.

13. The multi-layer switch of claim 8, wherein the multi-layer switch operates substantially in accordance with the RMON Ethernet standard.

14. A combined wired Local Area Network (wired LAN) and Wireless Local Area Network (WLAN) the services a plurality of WLAN clients, the combined wired LAN and WLAN comprising:
   a wired network infrastructure;
   a plurality of Wireless Access Points (WAPs) coupled to the wired network infrastructure;
   a multi-layer switch coupled to the wired network infrastructure;
   wherein a WAP of the plurality of WAPs and the multi-layer switch service packetized communications for a plurality of WLAN clients;
   wherein the multi-layer switch identifies a WLAN client serviced by the WAP from the monitored packetized communications;
   wherein the multi-layer switch receives an overloading indication from the WAP;
   wherein, the multi-layer switch determines that the WLAN client serviced by the WAP exceeds a usage threshold; and
   wherein the multi-layer switch reduces the wireless bandwidth provided to the WLAN client by the WAP.

15. The combined wired LAN and WLAN of claim 14, wherein the multi-layer switch reduces the wireless bandwidth provided to the WLAN client by reducing a Class of Service (CoS) provided to the WLAN client by the WAP.

16. The combined wired LAN and WLAN of claim 14, wherein the multi-layer switch reduces the wireless bandwidth provided to the WLAN client by introducing round trip delay into packetized communications serviced by the multi-layer switch to reduce the rate at which corresponding higher layer communication protocols apply data.

17. The combined wired LAN and WLAN of claim 14, wherein in determining that the WLAN client serviced by the WAP exceeds a usage threshold the multi-layer switch:
   determines a usage threshold for the WLAN client;
   compares a current usage level of the WLAN client to the usage level for the WLAN client; and
   when the comparison is unfavorable, concludes that the WLAN client serviced by the WAP exceeds the usage threshold.

18. The combined wired LAN and WLAN of claim 14, further comprising a network manager that:
   determines a usage threshold for the WLAN client;
   compares a current usage level of the WLAN client to the usage level for the WLAN client;
   when the comparison is unfavorable, concludes that the WLAN client serviced by the WAP exceeds the usage threshold; and
   reports to the multi-layer switch that the WLAN client serviced by the WAP exceeds the usage threshold.

19. The combined wired LAN and WLAN of claim 14, wherein in identifying the WLAN client the multi-layer switch:
   extracts MAC addresses from the packetized communications, one of the MAC addresses corresponding to the WLAN client.

20. The combined wired LAN and WLAN of claim 14, wherein multi-layer switch operates substantially in accordance with the RMON Ethernet standard.

* * * * *